Patented Jan. 18, 1927.

UNITED STATES PATENT OFFICE

JOSEF JANNEK, GUSTAV WIETZEL, AND FRITZ STOEWENER, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY.

RECOVERY OF VOLATILE SUBSTANCES.

No Drawing. Application filed August 17, 1925. Serial No. 50,842, and in Germany September 5, 1924.

It is known to recover vapors or gases which are present in the air or other gases by means of solid adsorbing masses, but usually such gas mixtures contain moisture which when the mixture is treated with adsorbents, is also adsorbed simultaneously with the desired vapor or gas such for example as benzol or ethylene. Hereby the amount of the desired gas or vapor taken up by the adsorbing medium is considerably reduced which requires a more frequent treatment by regeneration and also a far greater energy, required for the regeneration of the solid adsorbent than would be necessary for the expulsion of the desired vapor or gas.

The process in accordance with our invention is a more economical method of recovery of vapors or gases from mixtures containing water vapor and consists in the use of adsorbents or combinations of adsorbents which hold back the water vapor and allow the desired gas or vapor a free passage through the adsorbent retaining the water vapor in order to adsorb it in a pure state in a second stage of the process. The first part of the adsorbent which is chiefly charged with water, when exhausted is regenerated for itself by very cheap means, for example hot flue or waste gases, while the adsorbent charged with the desired gas or vapor is regenerated for example by means of steam with or without the assistance of a vacuum, the adsorbed product being thus recovered without dilution. The adsorbent is becoming moist by the treatment with steam and may be dried in any suitable manner, for example with hot gases heated by the passage through the adsorbent which has been used for the adsorption and previously charged with water vapor and regenerated with hot gases as described before.

For the purpose of our invention hydrophile means are very suitable such for example as silica gel, alumina gel, natural or artificial zeolite, whether alone or combined with hydrophobic adsorbents, for example active charcoal.

By employing a hydrophile agent alone, for example silica gel, this agent is suitably arranged in a system of vessels arranged in series, the number of these vessels being so chosen that when the whole system is saturated, the first vessel contains substantially water while the subsequent vessels or the last vessel substantially contain the desired vapor or gas in an adsorbed state. The hydrophile small-porous adsorbent adsorbing both water vapor and organic gases or vapors is very suitable, and by an interchangeable arrangement of the vessels and by providing a reserve vessel the process can be worked in an entirely continuous manner.

Instead of employing a hydrophile body alone, a combination of two hydrophile bodies of different width of pores may be employed, the first of which with wide pores is more suitable for adsorbing water vapor, while the second with smaller pores has been found especially suitable for adsorbing vapors and gases, such as benzol or ethylene. By employing such a combination a smaller number of vessels will be sufficient not only because the wide porous adsorbents have a greater capacity for taking up water than a small-porous mass, but because the benzol or ethylene vapors adsorbed by such mass are more rapidly replaced by water vapor. Generally, one vessel each for the two adsorbents with a reserve vessel each is sufficient for maintaining a continuous operation.

A hydrophile adsorbing body, for example silica gel, may also be combined with a hydrophobic mass for example active charcoal which has a poor adsorbing power for water vapor and which in consequence thereof substantially retains the desired vapor or gas and only very subordinate fractions of the water vapor that may be left after the treatment with silica gel. For such combinations a wide-porous gel is also preferably used in the first stage.

The width of pores can be influenced to a far-going extent by altering the time and temperature for drying the hydrogel, or the state of purity of the latter or by the application of a vacuum during the drying process. As a rule, slow drying and high state of purity is favorable to the formation of the small-porous product.

Our invention is more fully explained by the following examples to which however we do not wish to restrict our invention.

*Example 1.*

A gas saturated with water vapor and containing about 1 per cent, by volume, of benzol vapor is passed through 5 vessels arranged in series and filled with small-porous silica gel in grains capable of adsorbing for example from a gas containing 1 per cent, by volume, of benzol vapor, 23 per cent, by weight, of benzol and from a gas free from benzol but saturated with moisture at ordinary temperature 35 per cent, by weight of water. When the gas leaving the 4th vessel contains benzol vapor, the first vessel which will then be loaded with water only or substantially, and the 4th vessel which is charged with benzol or substantially with benzol, are cut out and each regenerated for itself, the first by means of hot gases and the 4th vessel by means of superheated steam while the gases are in the meantime passed through the 2nd, 3rd and 5th vessels. After regeneration vessels 1 and 4 are intercalated into the system as the two last vessels thereof.

*Example 2.*

A vessel containing wide-porous silica gel capable of taking up from a dry gas containing 1 per cent of benzol vapor, 8 per cent, by weight, of benzol and from a gas saturated at room temperature with water vapor, 85 per cent, by weight, of water, is connected with a vessel supplied with small-porous gel of the character described in the foregoing example. A moist gas containing benzol vapor of the composition described in the first example is first passed through the vessel containing the wide-porous mass and thereafter through the 2nd vessel until the gas leaving the 2nd vessel contains benzol vapor. The mixture is then passed through a second system of exactly the same kind, and the first system is regenerated by treating the first vessel substantially charged with water with hot gases and the second one predominantly containing benzol vapor or benzol by means of steam.

In this case the second vessel may be charged with active carbon instead of small-porous silica gel.

We claim:

1. A process of recovering organic vapors or gases from moist gases which consists in passing the moist gas mixture through an adsorbing mass capable of adsorbing water in preference to the said organic vapors or gases and replacing the vapors or gases adsorbed in the adsorbing mass near the entrance of the gas current by the water adsorbed from the gas so as to effect a separation of water and the vapors or gases to be recovered.

2. A process of recovering organic vapors or gases from moist gases which consists in passing the moist gas through a plurality of vessels arranged one after the other and connected with each other which contain an adsorbing body capable of retaining water vapor in preference to organic vapors or gases and replacing the vapors or gases adsorbed in the adsorbing mass near the entrance of the gas current by the water adsorbed from the gas so as to effect a separation of water and the vapors or gases to be recovered, and regenerating the masses separately adsorbing body chiefly charged with water separately from that chiefly charged with the organic vapor or gas when exhausted.

3. A process of recovering organic vapors or gases from moist gases which consists in passing the moist gas through a plurality of vessels arranged one after the other and connected with each other of which that near the entrance of the gases is charged with an adsorbing mass capable of retaining water vapor in preference to organic vapors or gases while the last vessel is supplied with a mass especially suitable for the adsorption of organic vapors or gases and replacing the vapors or gases adsorbed in the adsorbing mass near the entrance of the gas current by the water adsorbed from the gas so as to effect a separation of water and the vapors or gases to be recovered.

4. A process of recovering organic vapors or gases from moist gases which consists in passing the moist gas through a plurality of vessels arranged one after the other and connected with each other of which that near the entrance of the gases is charged with silica gel and the last one with a mass especially suitable for the adsorption of organic vapors or gases and replacing the vapors or gases adsorbed in the adsorbing mass near the entrance of the gas current by the water adsorbed from the gas so as to effect a separation of water and the vapors or gases to be recovered, and when exhausted regenerating the silica gel by means of hot gases and the mass loaded with organic vapors or gases by means of steam and in the meantime passing the gas through a reserve system of a similar kind to the first system.

In testimony whereof we have hereunto set our hands.

JOSEF JANNEK.
GUSTAV WIETZEL.
FRITZ STOEWENER.